United States Patent [19]

Washington et al.

[11] Patent Number: 5,750,281

[45] Date of Patent: *May 12, 1998

[54] EDGE MANIFOLD ASSEMBLY FOR AN ELECTROCHEMICAL FUEL CELL STACK

[75] Inventors: Kirk B. Washington, Richmond; John T. Kenna, North Vancouver; Greg A. James, Vancouver; Shiraz N. Ramji, Burnaby, all of Canada

[73] Assignee: Ballard Power Systems Inc., Burnaby, Canada

[*] Notice: The term of this patent shall not extend beyond the expiration date of Pat. No. 5,514,487.

[21] Appl. No.: 579,243

[22] Filed: Dec. 28, 1995

Related U.S. Application Data

[63] Continuation-in-part of Ser. No. 363,889, Dec. 27, 1994, Pat. No. 5,514,487.

[51] Int. Cl.⁶ .................................................. H01M 8/04
[52] U.S. Cl. .................. 429/39; 429/34; 429/35; 429/38
[58] Field of Search ............................ 429/34, 35, 38, 429/39

[56] References Cited

U.S. PATENT DOCUMENTS

| | | |
|---|---|---|
| 3,278,336 | 10/1966 | Uline et al. |
| 3,615,838 | 10/1971 | Erickson. |
| 3,814,631 | 6/1974 | Warszawski et al. |
| 4,346,150 | 8/1982 | Bellows et al. |
| 4,403,018 | 9/1983 | Alfenaar et al. |
| 4,743,518 | 5/1988 | Romanowski. |
| 4,943,495 | 7/1990 | Okada et al. |
| 5,108,849 | 4/1992 | Watkins et al. |
| 5,200,278 | 4/1993 | Watkins et al. |
| 5,366,821 | 11/1994 | Merritt et al. |
| 5,432,021 | 7/1995 | Wilkinson et al. .............. 429/38 X |

Primary Examiner—John S. Maples
Attorney, Agent, or Firm—McAndrews, Held & Malloy, Ltd.

[57] ABSTRACT

An edge manifold assembly conducts, introduces and receives reactant and coolant streams to and from an electrochemical fuel cell stack. The assembly comprises a plurality of manifold plates. Each of the fuel cells has a single manifold plate or at least three manifold plates attached thereto. Each of the manifold plates has at least one manifold opening formed therein for containing a fluid and at least one channel formed therein for effecting fluid communication between the manifold opening and the fuel cell to which the manifold plate is attached.

46 Claims, 12 Drawing Sheets

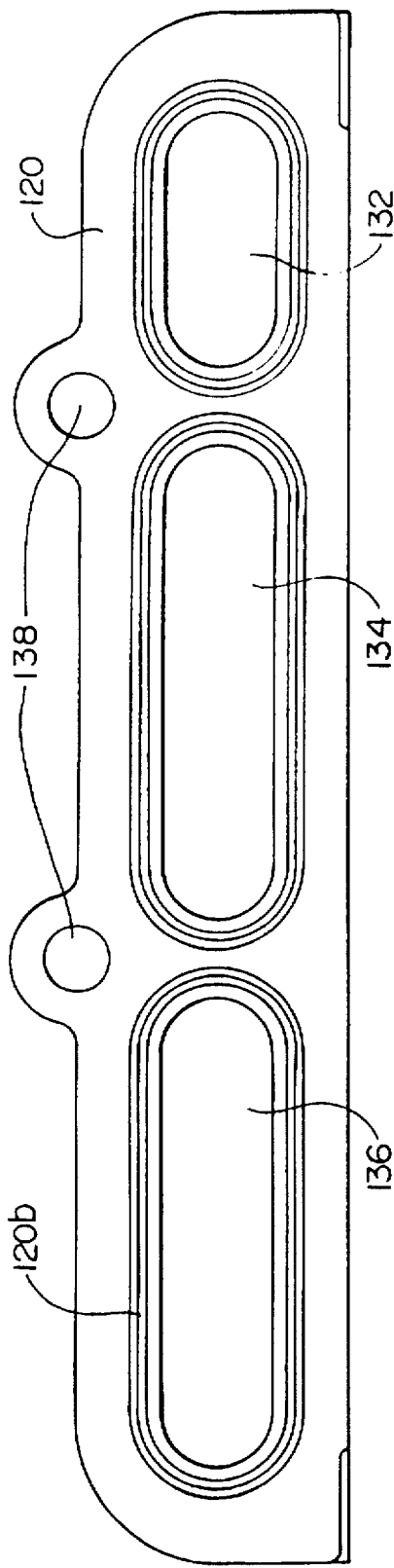
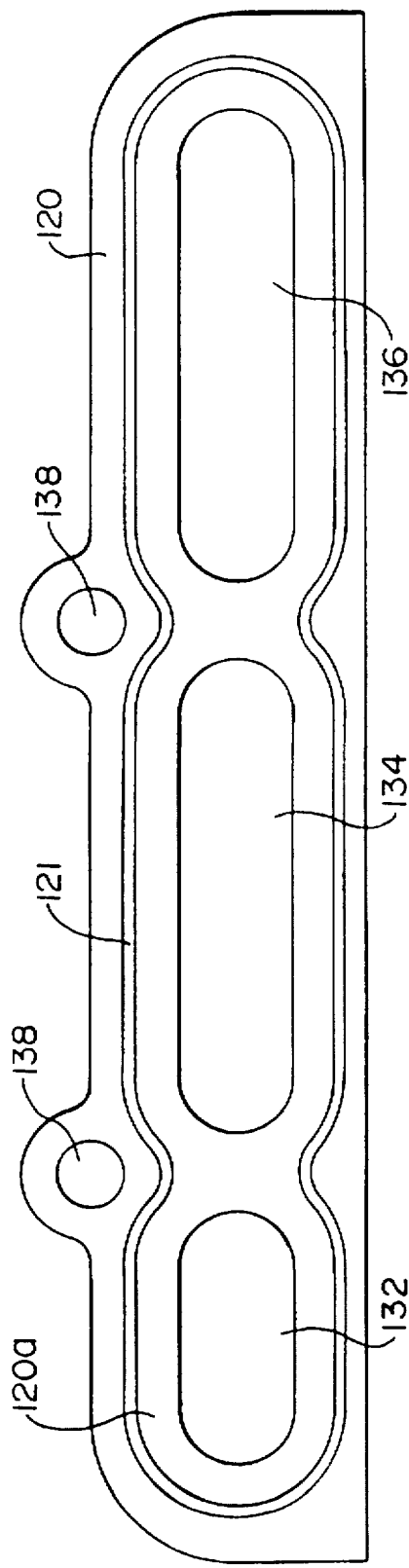

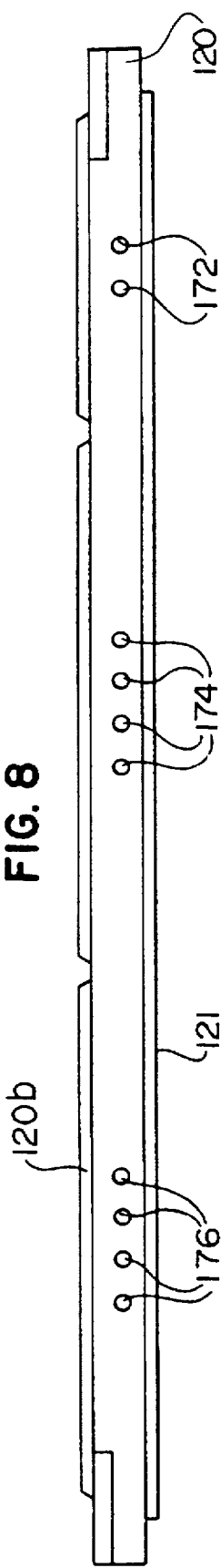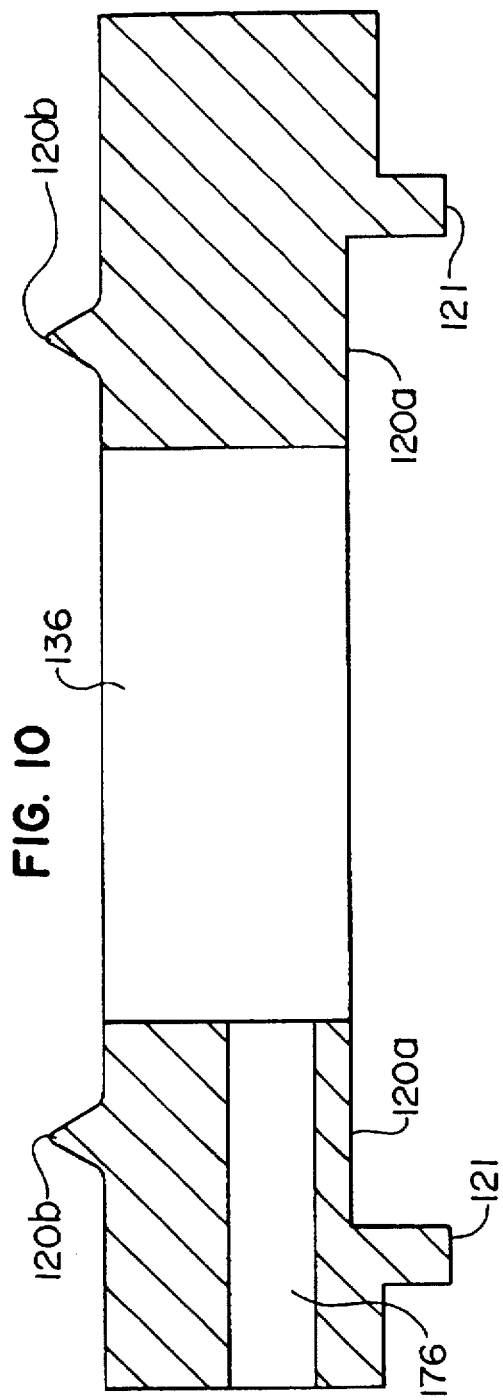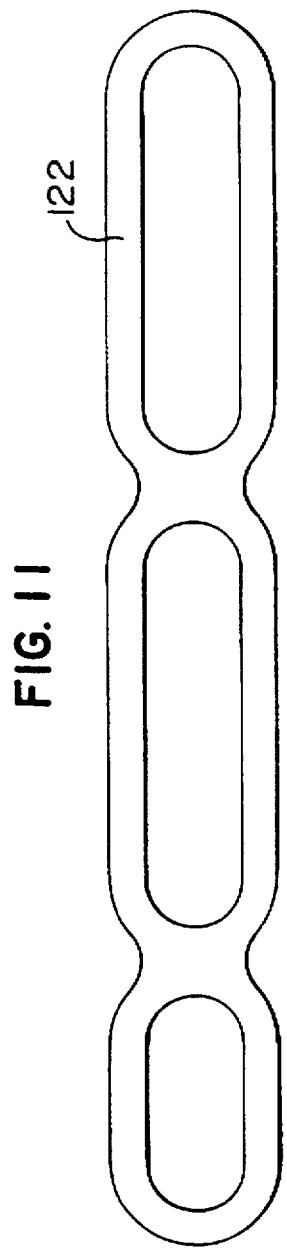

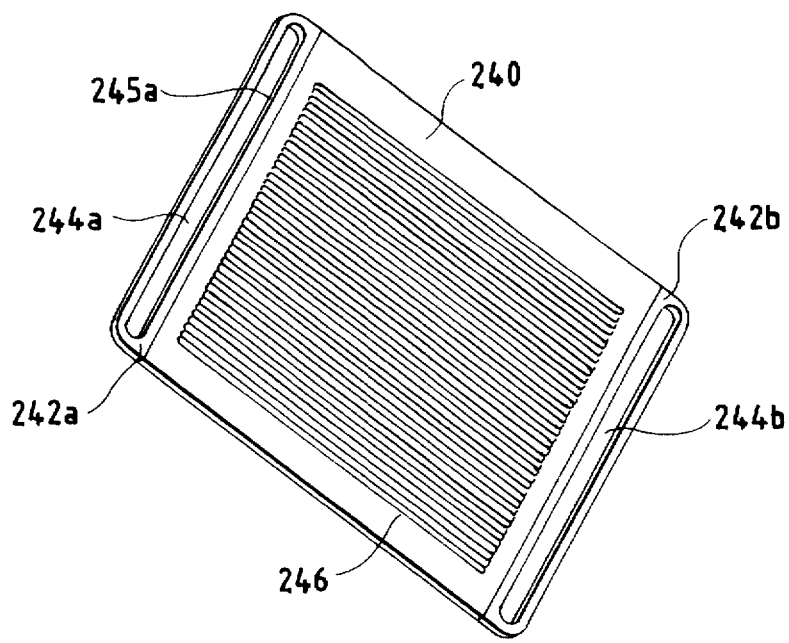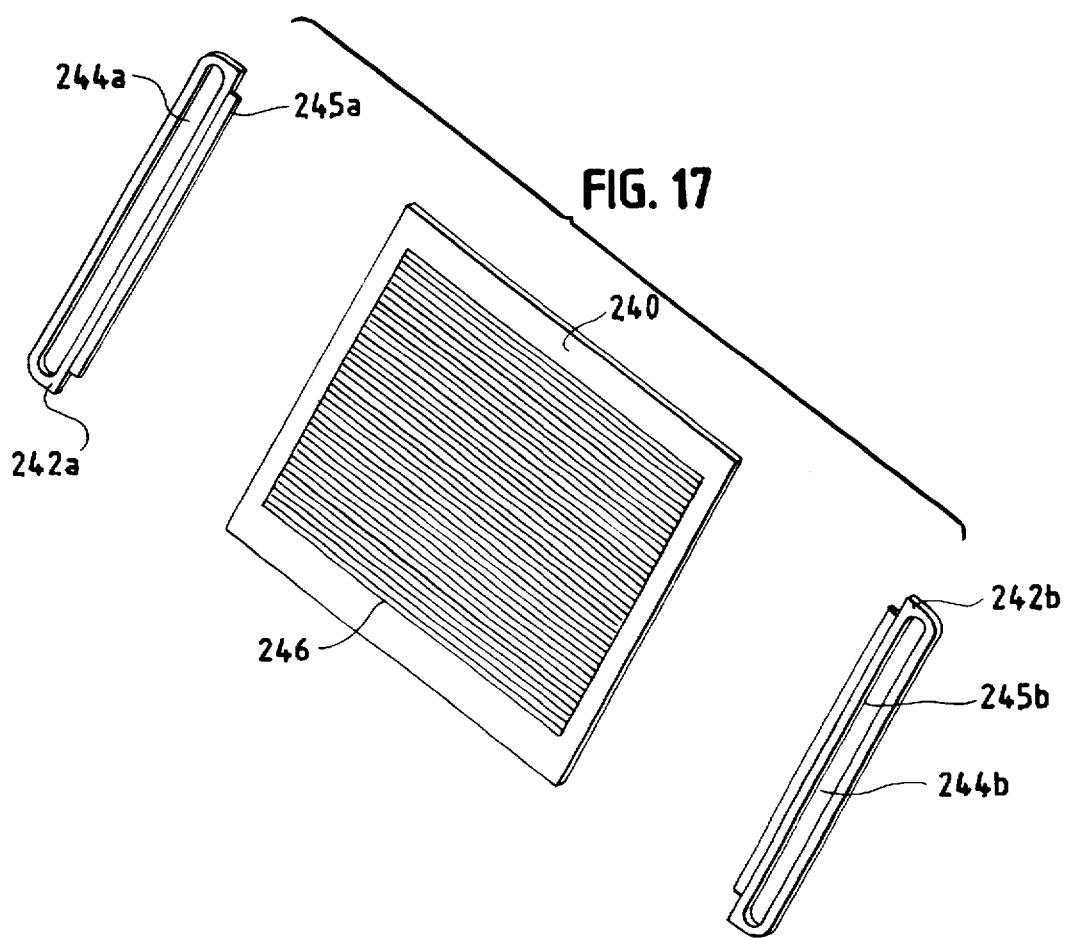

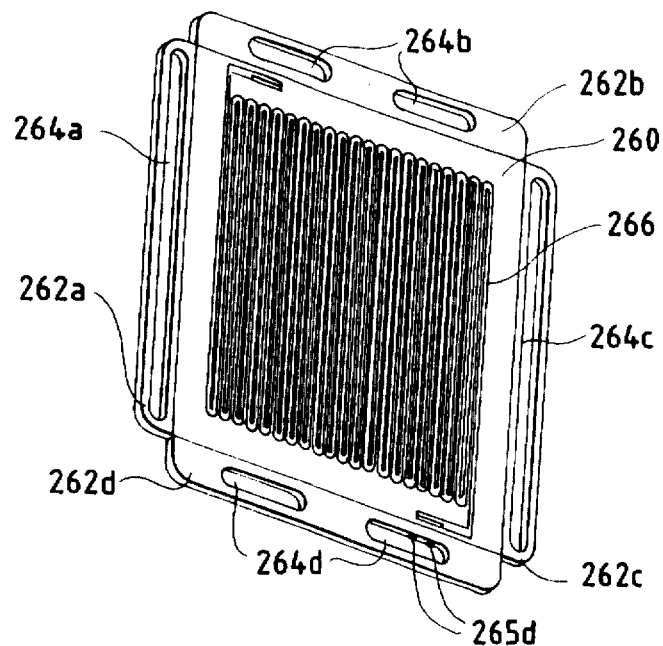
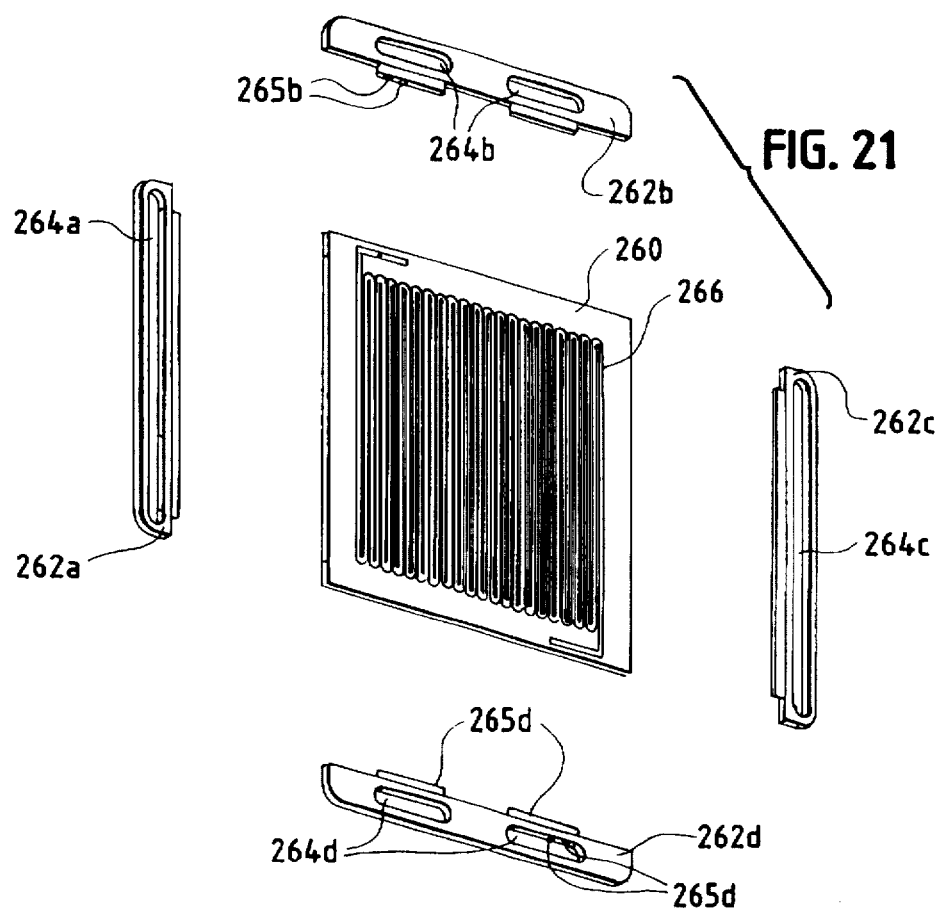

EDGE MANIFOLD ASSEMBLY FOR AN ELECTROCHEMICAL FUEL CELL STACK

CROSS-REFERENCE TO RELATED APPLICATION

This application is a continuation-in-part of U.S. patent application Ser. No. 08/363,889 filed Dec. 27, 1994, now U.S. Pat. No. 5,514,487.

FIELD OF THE INVENTION

The present invention relates to electrochemical fuel cells. More particularly, the present invention relates to an assembly of edge manifold plates mounted on the sides of an electrochemical fuel cell stack. The edge manifold assembly directs the reactant and coolant streams along the perimeter of the stack, and selectively introduces and removes the reactant and coolant streams to and from the individual fuel cells.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

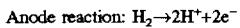

Anode reaction: $H_2 \rightarrow 2H^+ + 2e^-$

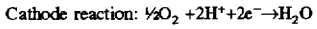

Cathode reaction: $\tfrac{1}{2}O_2 + 2H^+ + 2e^- \rightarrow H_2O$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack. It is generally convenient to locate all of the inlet and outlet ports at the same end of the stack.

In conventional electrochemical fuel cell stacks employing solid polymer ion exchange membranes, the manifolds for directing reactants and products to and from the individual fuel cells are formed by aligning a series of manifold openings or perforations formed at the interior of the reactant flow field plates. For example, Watkins et al. U.S. Pat. No. 5,108,849 discloses, in FIG. 4 and the accompanying text, a reactant fluid flow field plate having a plurality of openings formed at the corners, including a fluid supply opening and a fluid exhaust opening. Each channel formed in the Watkins flow field plate includes an inlet end directly connected to the fluid supply opening and an outlet end directly connected to the fluid exhaust opening. The channels direct the reactant gas stream from the supply opening to the central, electrocatalytically active area of the fuel cell. When multiple fluid flow field plates are arranged in a stack, each of fluid supply and exhaust openings aligns with the corresponding opening in the adjacent plates to form a manifold for directing the reactant fluid stream through the extent of the stack.

In other types of conventional fuel cell stacks, primarily those employing liquid electrolytes, the manifolds for directing reactants and products to and from the individual fuel cells are located in a frame surrounding the cell plates. For example, in Uline U.S. Pat. No. 3,278,336, a frame having apertures formed in its upper and lower marginal portions introduces reactant gas and electrolyte to the electrode and discharges reactant gas and electrolyte from the electrode.

Erickson U.S. Pat. No. 3,615,838, Warszawski U.S. Pat. No. 3,814,631, Bellows U.S. Pat. No. 4,346,150, Alfenaar U.S. Pat. No. 4,403,018, Romanowski U.S. Pat. No. 4,743,518, and Okada U.S. Pat. No. 4,943,495 disclose additional examples of conventional fuel cell stacks in which the manifolds for directing reactants and products to and from the individual fuel cells are located in a frame surrounding the cell plates. Frame manifold structures have inherent disadvantages in that (1) frame manifold structures increase the overall volume of the fuel cell stack, (2) frame manifold structures are generally expensive to manufacture and/or mold, (3) frame manifold structures generally employ complicated and potentially inefficient sealing schemes to isolate the reactant and electrolyte streams from each other, from the electrochemically active region of the fuel cell, and from the external environment, and (4) frame manifold structures impede access to the interior stack components, such as the fuel cells themselves and associated structures such as bus plates.

SUMMARY OF THE INVENTION

An improved edge manifold assembly is provided for an electrochemical fuel cell stack comprising a plurality of fuel cells. The assembly comprises a plurality of manifold plates. Each of the fuel cells has at least three manifold plates attached thereto. Each of the manifold plates has at least one manifold opening formed therein for containing a fluid and has at least one channel formed therein for effecting fluid communication between the manifold opening and the fuel cell to which each of the manifold plates is attached.

In a first preferred embodiment, each of the fuel cells is substantially rectangular in cross section and the at least three manifold plates is three manifold plates each disposed on a different side of each of the fuel cells. Each of the fuel cells is most preferably substantially square in cross section.

In a second preferred embodiment, each of the fuel cells is substantially rectangular in cross section and the at least three manifold plates is four manifold plates each disposed on a different side of each of the fuel cells. Each of the fuel cells is most preferably substantially square in cross section.

In the preferred edge manifold assembly, each of the manifold plates has a tube mounted within each of the at least one channel. The tube extends from the manifold plate into the fuel cell to which the manifold plate is attached. The tube is preferably metallic.

In the preferred edge manifold assembly, the at least one channel comprises a plurality of spaced channels for effecting fluid communication between the manifold opening and the fuel cell to which the manifold plates are attached. The channels preferably extend through each of the manifold plates substantially in parallel. The at least one manifold opening is preferably formed such that the channels extend through each of the manifold plates substantially the same distance.

In the preferred edge manifold assembly, each of the manifold plates has a recessed portion formed in one surface thereof. The recessed portion substantially circumscribes the at least one manifold opening, and a notched portion extends from the oppositely facing surface thereof, such that the notched portion extends into the recessed portion of the adjacent manifold plate. A sealing gasket is preferably disposed within the recessed portion such that the notched portion of the adjacent manifold plate compresses the sealing gasket.

In the preferred edge manifold assembly, the manifold plates are formed from an electrically insulating material.

In a third preferred embodiment of an edge manifold assembly for an electrochemical fuel cell stack comprising a plurality of fuel cells, the assembly comprises a plurality of manifold plates, and each of the fuel cells has a single manifold plate attached thereto. The manifold plate has at least one manifold opening formed therein for containing a fluid and has at least one channel formed therein for effecting fluid communication between the manifold opening and the fuel cell to which the manifold plate is attached. The manifold plate does not completely circumscribe the fuel cell to which the manifold plate is attached. Each of the fuel cells is preferably polygonal in cross section.

An improved electrochemical fuel cell stack comprises a plurality of fuel cells. Each of the fuel cells has a single manifold plate or at least three manifold plates attached thereto. Each of the manifold plates has at least one manifold opening formed therein for containing a fluid and has at least one channel formed therein for effecting fluid communication between the manifold opening and the fuel cell to which each of the manifold plates is attached.

BRIEF DESCRIPTION OF THE DRAWINGS

FIG. 6 is a plan view of the top surface of one of the pair of edge manifold plates illustrated in FIGS. 4 and 5.

FIG. 7 is a plan view of the bottom surface of the edge manifold plate illustrated in FIG. 6.

FIG. 8 is a side elevation view of the edge manifold plate illustrated in FIGS. 6 and 7.

FIG. 10 is a side sectional view of the edge manifold plate taken along the broken surface illustrated in FIG. 9.

FIG. 11 is a plan view of the sealing gasket accommodated in the recessed portion of the edge manifold plate illustrated in FIG. 7.

FIG. 16 is a perspective view of a fluid flow field plate with a pair of edge manifold plates attached thereto, each edge manifold plate having a single interior manifold opening for conducting a reactant or coolant stream which communicates with the fuel cell to which the manifold plate is attached.

FIG. 17 is an exploded perspective view of the fluid flow field plate with a pair of edge manifold plates attached thereto, illustrated in assembled form in FIG. 16.

FIG. 20 is a perspective view of a fluid flow field plate with four noncontiguous edge manifold plates attached thereto along four sides.

FIG. 21 is an exploded perspective view of the fluid flow field plate with four noncontiguous edge manifold plates attached thereto, illustrated in assembled form in FIG. 20.

DETAILED DESCRIPTION OF THE PREFERRED EMBODIMENTS

Figure 1:
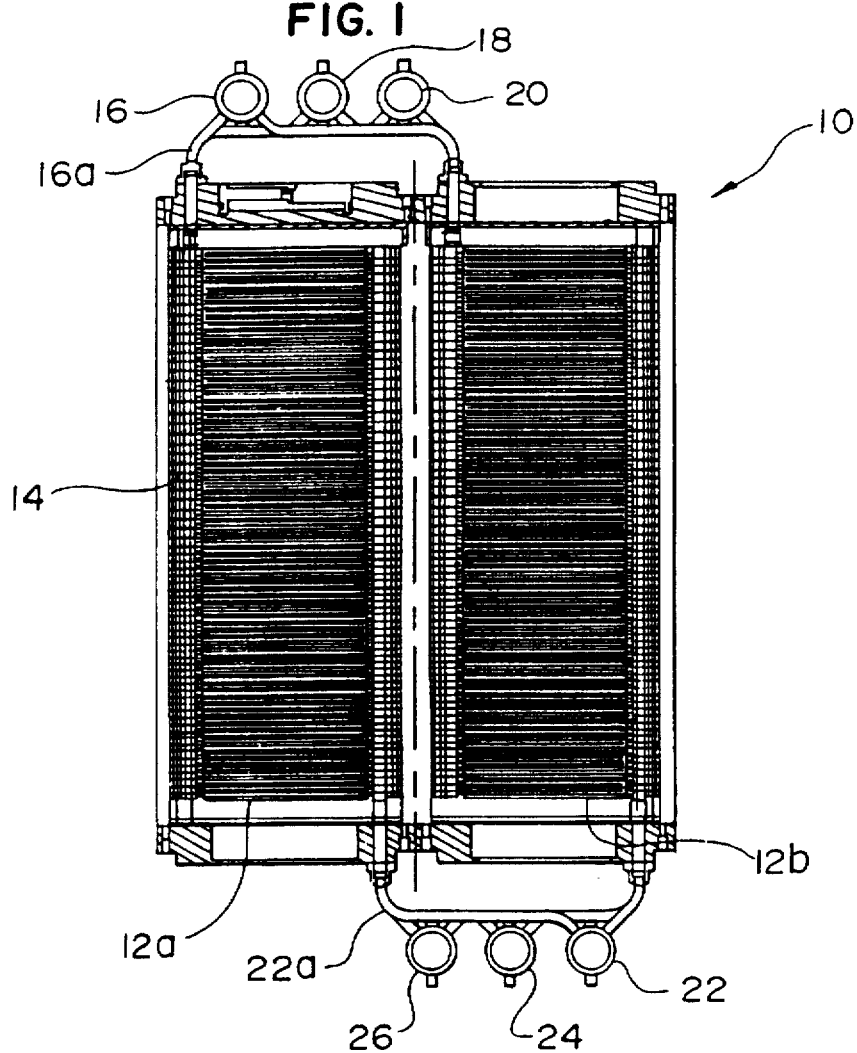
FIG. 1 is a side elevation view of an electrochemical fuel cell stack array having an edge manifold assembly associated with each of the stacks.

Turning first to FIG. 1, an electrochemical fuel cell stack array 10 includes four fuel cell stacks, two of which are illustrated in FIG. 1 as stacks 12a and 12b. Each stack is in turn composed of a plurality of individual fuel cells, one of which is designated in FIG. 1 as fuel cell 14. A fuel cell stack 10 is more completely described in Watkins et al. U.S. Pat. No. 5,200,278 (in FIGS. 1–6 and the accompanying text), which is incorporated herein by reference in its entirety. A preferred reactant supply and control system for fuel cells of the type which make up stack array 10 is described in Merritt et al. U.S. Pat. No. 5,366,821, which is also incorporated herein by reference in its entirety.

As shown in FIG. 1, the inlet reactant (preferably a hydrogen-containing fuel stream and an oxygen-containing oxidant stream) and coolant streams are directed to stack array 10 by external inlet manifolds 16, 18, 20. Each of the inlet reactant and coolant streams is in turn directed to the individual stacks by a plurality of inlet manifold conduits. The inlet manifold conduit for directing the reactant stream from external inlet manifold 16 to stack 12a is designated in FIG. 1 as inlet manifold conduit 16a.

As further shown in FIG. 1, the outlet reactant and coolant streams are directed from the individual stacks by a plurality of outlet manifold conduits. The outlet manifold conduit for directing the reactant stream from stack 12a to external outlet manifold 22 is designated in FIG. 1 as manifold conduit 22a. Each of the outlet reactant and coolant streams is in turn directed from stack array 10 by external outlet manifolds 22, 24, 26.

Figure 2:
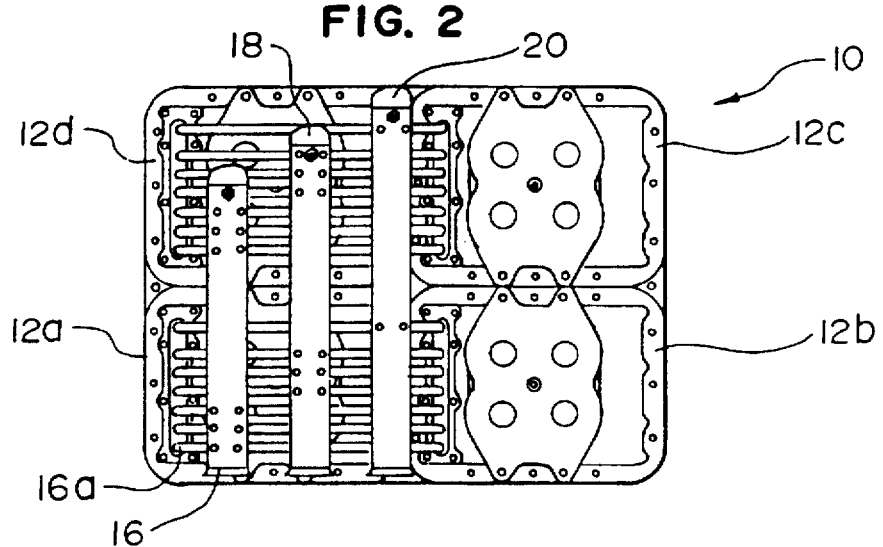
FIG. 2 is a top view, looking downwardly, of the electrochemical fuel cell stack array illustrated in FIG. 1.

FIG. 2 is a top view of stack array 10, showing each of the four fuel cell stacks 12a, 12b, 12c, 12d, as well as the external inlet manifolds 16, 18, 20 for directing the inlet reactant and coolant streams to stack array 10. Inlet manifold conduit 16a directs the reactant stream from external inlet manifold 16 to stack 12a.

Figure 3:
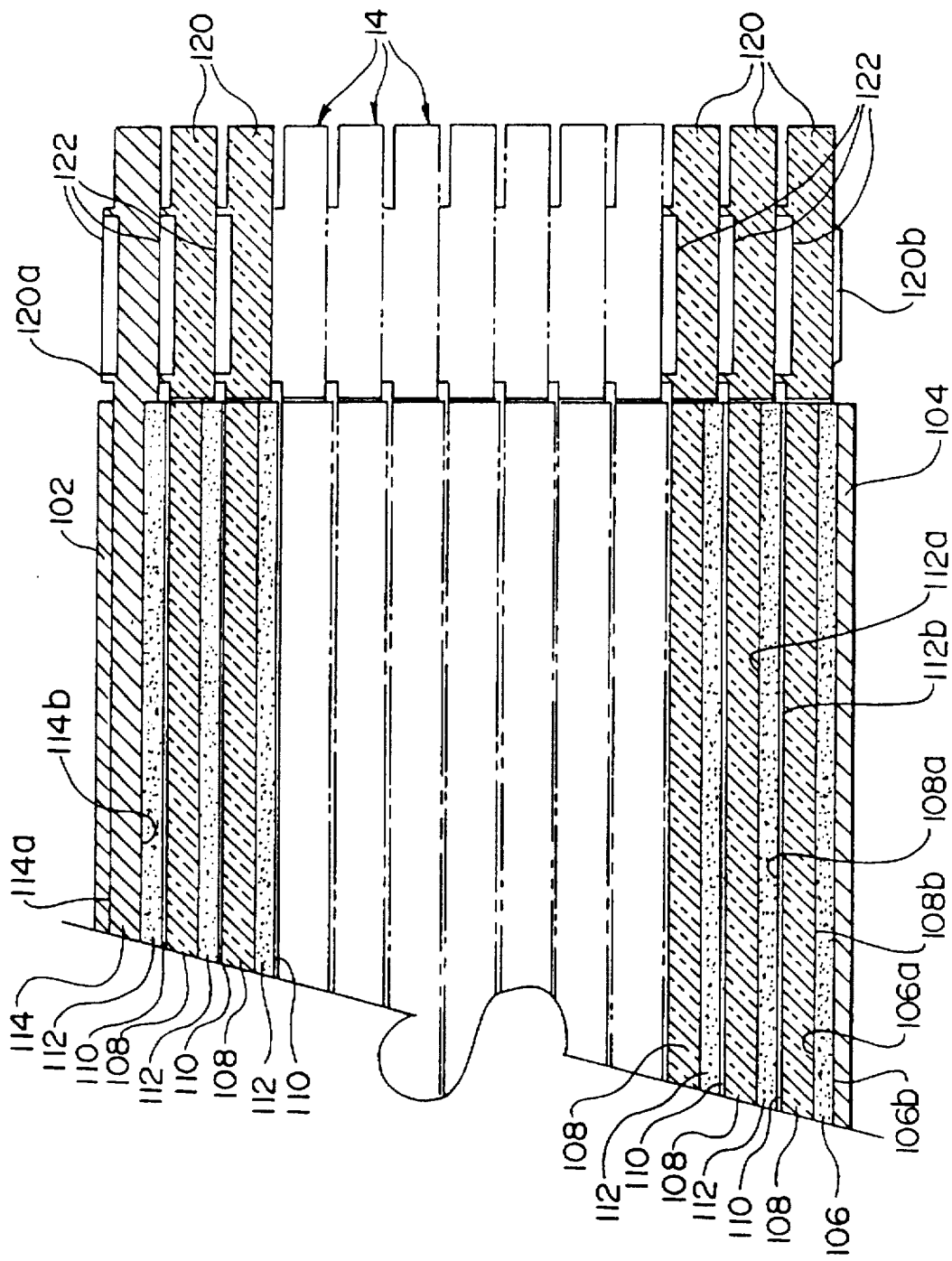
FIG. 3 is a side sectional view of a portion of one of the stacks of the electrochemical fuel cell stack array illustrated in FIGS. 1 and 2.

FIG. 3 is a side view of a portion of one of the stacks of the fuel cell stack array 10 illustrated in FIGS. 1 and 2. As shown in FIG. 3, a plurality of individual fuel cells 14 are arranged in a stacked series between bus plates 102, 104. The stack includes a blank plate 106 having major surfaces 106a, 106b which are substantially planar and blank (ungrooved, i.e., no flow channels are milled therein). Bottom surface 106b of blank plate 106 is located adjacent to and above bottom bus plate 104.

Each cathode plate 108 has a top surface 108a which has formed therein at least one, and preferably a plurality of, oxidant flow channels (not shown in FIG. 3). Cathode plate 108 also has a bottom major surface 108b which has formed therein at least one coolant flow channel (not shown in FIG. 3). Surface 108b faces the top surface 106a of blank plate 106 such that surfaces 106a and 108b cooperate to form a cooling jacket. A coolant fluid directed through the cooling jacket controls the temperature of the surrounding components of the stack.

As further shown in FIG. 3, the stack includes a plurality of membrane electrode assemblies (MEAs) 110, each of which preferably comprises a solid polymer ion exchange membrane interposed between a cathode which faces surface 108a of cathode plate 108 and an anode which faces upwardly in FIG. 3. Surface 108a cooperates with the cathode of MEA 110 to direct an oxidant stream across the surface of MEA 110. The cathodes in the stack are oriented so that product water formed by the electrochemical reaction at the cathode is urged downwardly by gravity into the oxidant stream flowing through the channels formed in surface 108a of cathode plate 108.

Each anode plate 112 has a bottom surface 112b which has formed therein at least one, and preferably a plurality of, fuel flow channels (not shown in FIG. 3). Surface 112b cooperates with the anode of MEA 110 to direct a fuel stream across the surface of MEA 110. Anode plate 112 also has a top major surface 112a which is substantially planar and blank (ungrooved, i.e., no channels are milled therein). Surface 112a of anode plate 112 faces the bottom surface 108b of the next adjacent plate 108 such that surfaces 112a and 108b cooperate to form a cooling jacket.

The above construction of fuel cells 14, comprising cathode plate 108, MEA 110 and anode plate 112, repeats as the stack extends from the bottom to the top of FIG. 3. An end cell plate 114 is located adjacent to and above the uppermost anode plate 112 of the stack. End cell plate 114 has a bottom major surface 114b which has formed therein at least one coolant flow channel (not shown in FIG. 3). Surface 114b faces the top surface 112a of the uppermost anode plate 112 such that surfaces 112a and 114b cooperate to form a cooling jacket. Top surfaces 114a of end cell plate 114 is substantially planar and blank (ungrooved, i.e., no flow channels are milled therein). Top surface 114a of end cell plate 114 is located adjacent to and just below top bus plate 102.

A first assembly of stacked edge manifold plates, some of which are designated in FIG. 3 as edge manifold plates 120, is attached to the outer perimeter of the fuel cells 14. The first assembly of edge manifold plates 120 directs the inlet reactant and coolant streams along the outer perimeter of the fuel cells and introduces the inlet reactant and coolant streams to the appropriate portion of the fuel cell, namely, the hydrogen-containing fuel stream to the surface of the anode plate containing the fuel flow channels, the oxygen-containing oxidant stream to the surface of the cathode plate containing the oxidant flow channels, and the coolant stream to the surface of the cathode plate containing the coolant flow channels.

Each of the edge manifold plates 120 includes interior manifold openings for conducting the reactant and coolant streams and channels for effecting fluid communication between the interior manifold openings and the fuel cell to which the manifold plate is attached. Each of the edge manifold plates 120 has a recessed portion 120a formed in the upper surface thereof, as shown in FIG. 3. The recessed portion 120a substantially circumscribes each of the manifold openings. A notched portion 120b extends from oppositely facing surface of edge manifold plate 120. When assembled, the notched portion 120b extends into the recessed portion 120a of the adjacent manifold plate. Sealing gaskets 122 are disposed within the recessed portion 120a of each of the edge manifold plates 120 such that the notched portion 120b of the adjacent manifold plate compresses the sealing gaskets 122.

The manifold plates are preferably formed from a moldable, electrically insulating material, such as a thermoset or thermoplastic material with electrically insulating properties. The notch angle of the notched portion is preferably between about 30° and about 60°, such that a uniform seal between the notched portion and the adjacent sealing gasket is imparted when assembled.

A second assembly of edge manifold plates (not shown in FIG. 3), substantially identical to the first assembly of edge manifold plates 120, is attached to the opposite side of each of the fuel cells 14. The second assembly of edge manifold plates receives the outlet reactant and coolant streams from the appropriate portion of the fuel cell, namely, the fuel flow channels of the anode plate and the oxidant and coolant flow channels of the cathode plate.

Figure 4:
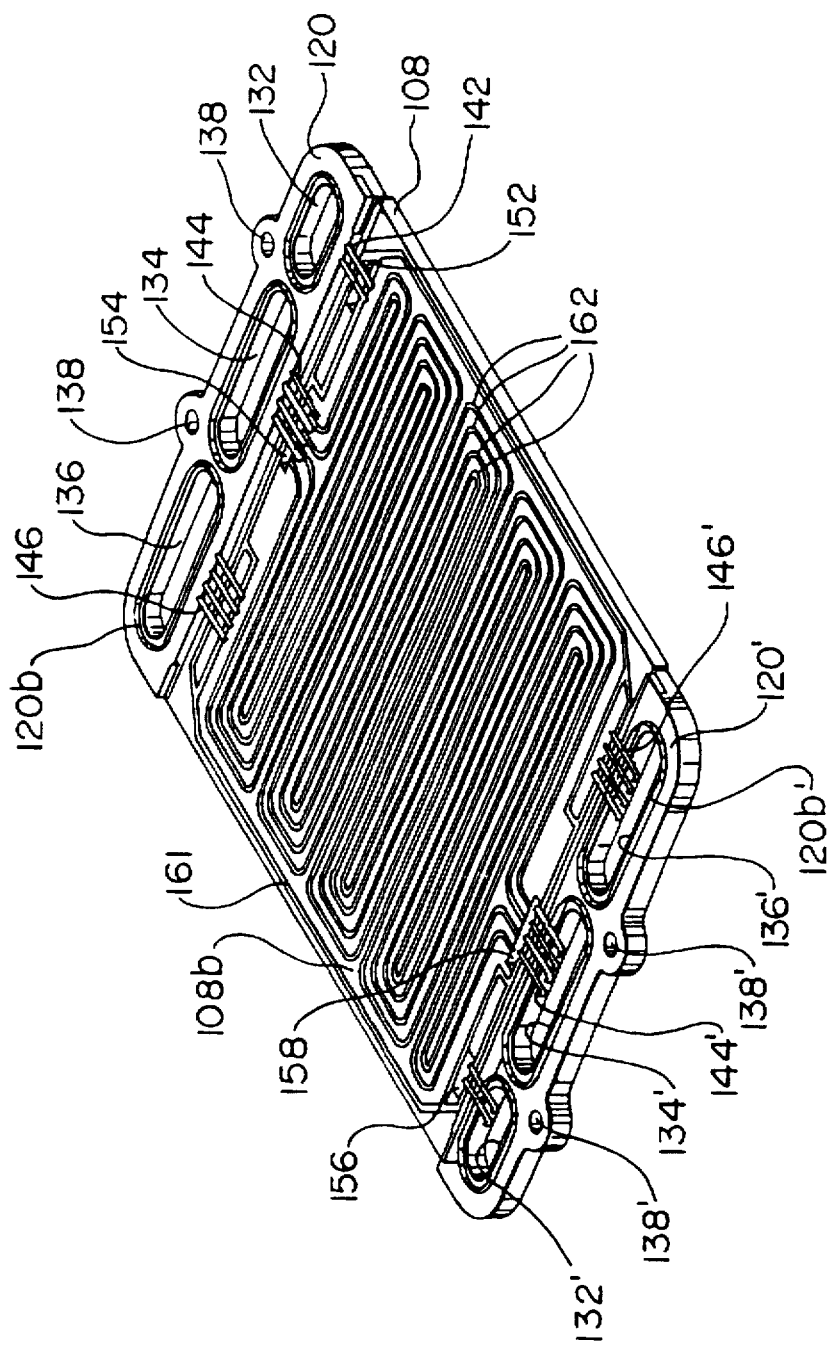
FIG. 4 is a perspective view of a fluid flow field plate with a pair of edge manifold plates attached thereto.
Figure 5:
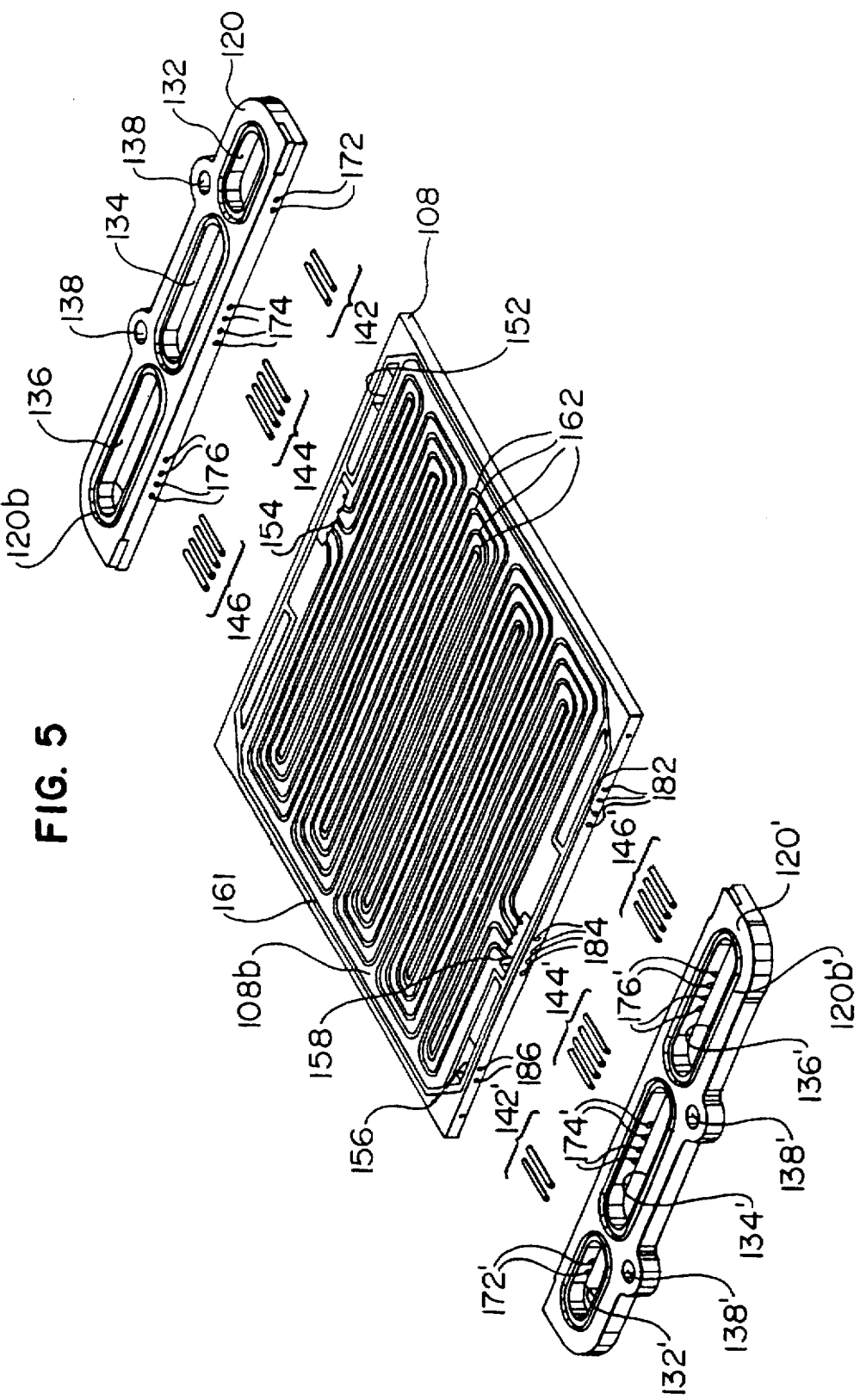
FIG. 5 is an exploded perspective view of the fluid flow field plate with a pair of edge manifold plates attached thereto, illustrated in assembled form in FIG. 4.

FIGS. 4 and 5 show, in assembled and exploded views, respectively, a cathode plate 108 with a pair of edge manifold plates 120, 120' attached thereto. Edge manifold plates 120, 120' are substantially identical in construction, but one conducts and introduces the inlet reactant and coolant streams to the appropriate portion of the fuel cell while the other receives and conducts the outlet reactant and coolant streams from the appropriate portion of the fuel cell, as explained below.

FIGS. 4 and 5 show the surface 108b of cathode plate 108 which has formed therein four coolant flow channels 162. Coolant flow channels 162 extend in a continuous, serpentine, substantially parallel pattern between coolant inlet opening 154 and coolant outlet opening 158 formed in plate 108. Gasket 161 mounted in a corresponding recess on the surface 108b circumscribes the inlet and outlet openings formed in cathode plate 108, as well as the coolant flow field on the surface 108b of cathode plate 108. The underside of cathode plate 108 contains four oxidant flow channels (not shown in FIGS. 4 and 5) which also extend in a continuous, serpentine, substantially parallel pattern between an oxidant inlet opening and an oxidant outlet opening formed in cathode plate 108. Cathode plate 108 is designed to cooperate with an adjacent anode plate (not shown in FIGS. 4 and 5, but shown and described in FIG. 3 and the accompanying text as anode plate 110). The adjacent anode plate has a blank surface facing surface 108b and an oppositely facing surface with two fuel flow channels which extend in a continuous, serpentine, substantially parallel pattern between a fuel inlet opening aligned with opening 152 and a fuel outlet opening aligned with opening 156 formed in cathode plate 108.

Edge manifold plate 120 has a fuel manifold opening 132, a coolant manifold opening 134, and an oxidant manifold opening 136 formed therein, as shown in FIGS. 4 and 5. A notched portion 120b of the plate 120 circumscribes oxidant manifold opening 136 and compresses the sealing gaskets disposed in the recessed portion of the adjacent edge manifold plate to isolate opening 136 from cathode plate 108 and from the external environment. Alignment openings 138 are also formed in edge manifold plate 120.

As shown in FIG. 5, two channels 172 formed in plate 120 effect fluid communication between the fuel manifold opening 132 and the fuel inlet opening 152 in cathode plate 108. Tubes 142, preferably metallic and most preferably formed of stainless steel, are mounted within the two fuel channels 172. When assembled, tubes 142 extend from plate 120 into cathode plate 108.

As further shown in FIG. 5, four channels 174 formed in plate 120 effect fluid communication between the coolant manifold opening 134 and the coolant inlet opening 154 in cathode plate 108. Tubes 144, preferably metallic and most preferably formed of stainless steel, are mounted within the four coolant channels 174. When assembled, tubes 144 extend from plate 120 into cathode plate 108. Similarly, four channels 176 formed in plate 120 effect fluid communication between the oxidant manifold opening 136 and the oxidant inlet opening (not shown in FIGS. 4 and 5) on the underside of plate 108. Tubes 146, preferably metallic and most preferably formed of stainless steel, are mounted within the four oxidant channels 176. When assembled, tubes 146 extend from plate 120 into cathode plate 108.

As shown in FIGS. 4 and 5, edge manifold plate 120' is attached to cathode plate 108 on the side opposite that to which edge manifold plate 120 is attached. Edge manifold plate 120' has a fuel manifold opening 132', a coolant manifold opening 134', and an oxidant manifold opening 136' formed therein. A notched portion 120b' of plate 120' circumscribes oxidant manifold opening 136' and compresses the sealing gaskets disposed in the recessed portion of the adjacent edge manifold plate to isolate opening 136' from cathode plate 108 and from the external environment. Alignment openings 138' are also formed in edge manifold plate 120'.

As shown in FIG. 5, two channels 172' formed in plate 120 effect fluid communication between the fuel manifold opening 1321 and the fuel outlet opening 156 in cathode plate 108. Tubes 142', preferably metallic and most preferably formed of stainless steel, are mounted within the two fuel channels 172'. When assembled, tubes 142' extend from plate 120' into channels 186 in cathode plate 108, as shown in FIG. 5.

Four channels 174' formed in plate 120' effect fluid communication between the coolant manifold opening 134' and the coolant outlet opening 158 in cathode plate 108. Tubes 144', preferably metallic and most preferably formed of stainless steel, are mounted within the four coolant channels 174'. When assembled, tubes 1441 extend from plate 120' into channels 184 in cathode plate 108. Similarly, four channels 176' formed in plate 120 effect fluid communication between the oxidant manifold opening 136' and the oxidant outlet opening (not shown in FIGS. 4 and 5) on the underside of plate 108. Tubes 146', preferably metallic and most preferably formed of stainless steel, are mounted within the four oxidant channels 176'. When assembled, tubes 146' extend from plate 120' into channels 182 cathode plate 108.

Edge manifold plates 120, 120' are preferably attached to the opposite edges of cathode plate 108 by an adhesive, but other methods of attachment could be employed as well. The adhesive is preferably applied at the adjoining edges of cathode plate 108 and each of edge manifold plates 120, 120'. The adhesive is also preferably applied in the region between the tubes and the channels in which the are mounted, for example, the region between tubes 142' and channels 172' and the region between tubes 142' and channels 186. The preferred adhesive is a gap-filling anaerobic adhesive having high strength and favorable high temperature properties, such as, for example, commercially available LOCTITE epoxy compounds. The presence of the tubes in the channels enhances the structural properties of the adhesive bond between the edge manifold plate and the adjacent cathode plate by increasing the rigidity of the finished part.

FIG. 6 shows the top surface of edge manifold plate 120 illustrated in FIGS. 4 and 5, including notched portion 120b, fuel manifold opening 132, coolant manifold opening 134, oxidant manifold opening 136, and alignment openings 138.

FIG. 7 shows the bottom surface of edge manifold plate 120 illustrated in FIG. 6, including recessed portion 120a for accommodating a sealing gasket, fuel manifold opening 132, coolant manifold opening 134, oxidant manifold opening 136, and alignment openings 138. A hard-stop ridge 121 is preferably formed around recessed portion 120a to properly space edge manifold plate 120 from the adjacent edge manifold plate when assembled.

FIG. 8 shows the edge of edge manifold plate 120 which faces the cathode plate, including notched portion 120b hard-stop ridge 121, fuel channels 172, coolant channels 174, and oxidant channels 176.

Figure 9:
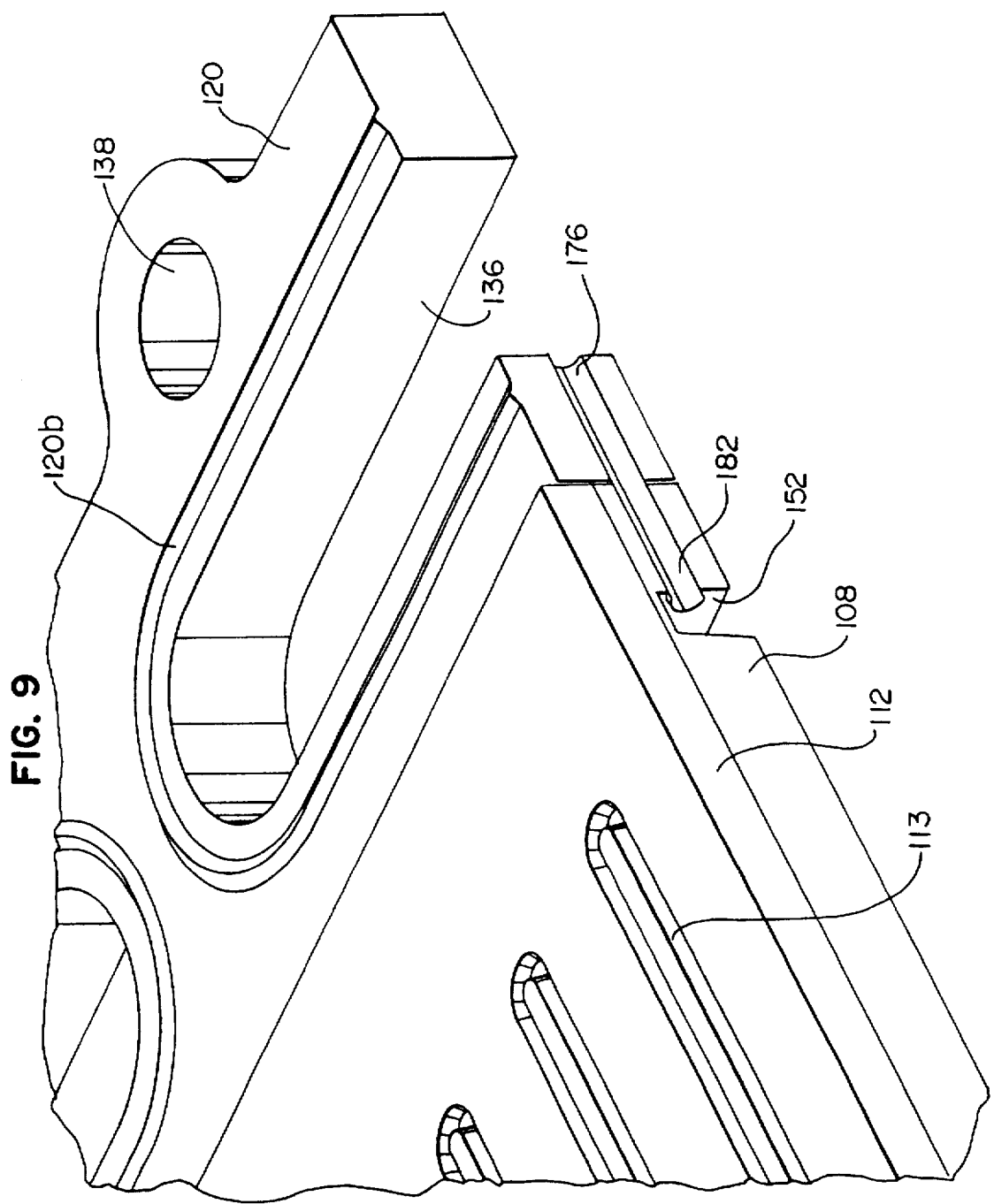
FIG. 9 is a perspective view of the edge manifold plate illustrated in FIGS. 6–8, broken to illustrate the channel for effecting fluid communication between the manifold opening and a flow channel of the fluid flow field plate to which the manifold plate is attached.

FIG. 9 shows edge manifold plate 120 illustrated in FIGS. 6–8, broken to illustrate the channel 176 for effecting fluid communication between the oxidant manifold opening 136 and the oxidant flow channel 152 of the adjacent cathode plate 108 via channel 182 in cathode plate 108. FIG. 9 also shows the assembled relationship of anode plate 112 with fuel flow channels 113 to cathode plate 108 and edge manifold plate 120.

FIG. 10 shows a side sectional view of edge manifold plate 120 taken along the broken surface illustrated in FIG. 9, including recessed portion 120a, notched portion 120b hard-stop ridge 121, oxidant manifold opening 136, and channel 176.

FIG. 11 shows the sealing gasket 122 that is accommodated in the recessed portion 120a of edge manifold plate 120 illustrated in FIG. 7. Sealing gasket is formed of a suitable resilient material such as, for example, neoprene rubber commercially available from MONSANTO under the trade name SANTOPRENE.

Figure 12:
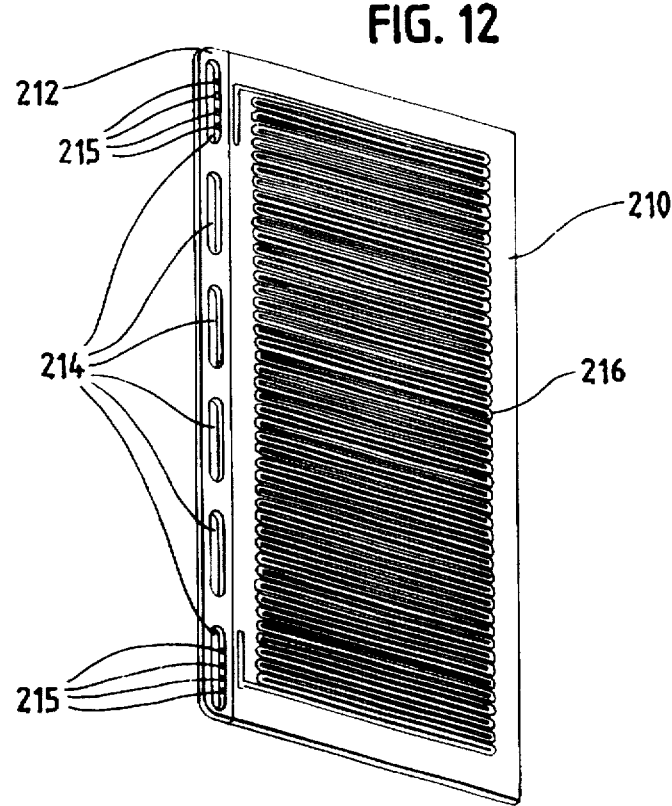
FIG. 12 is a perspective view of a fluid flow field plate with a single edge manifold plate attached thereto along one side.
Figure 13:
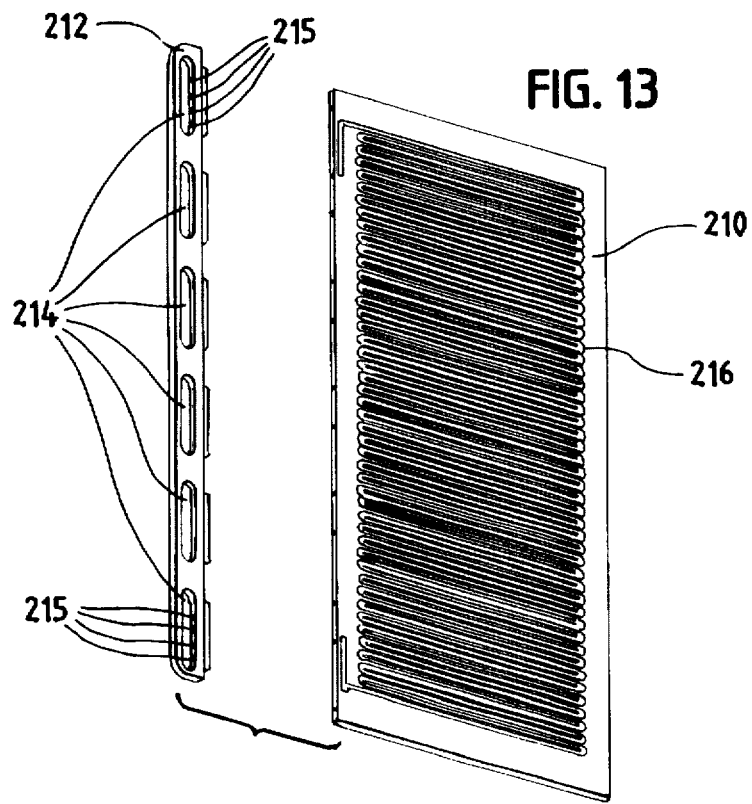
FIG. 13 is an exploded perspective view of the fluid flow field plate with a single edge manifold plates attached thereto along one side, illustrated in assembled form in FIG. 12.

FIGS. 12 and 13 show a fluid flow field plate 210 with a single edge manifold plate 212 attached thereto along one side. Edge manifold plate 212 has interior manifold openings 214 formed therein for conducting the reactant and coolant streams introduced to and exhausted from the adjacent fuel cell stack. Edge manifold plate 212 has channels 215 formed therein for effecting fluid communication between the manifold openings 214 and flow channels in flow field plate 210, such as flow channel 216 shown in FIGS. 12 and 13.

Figure 14:
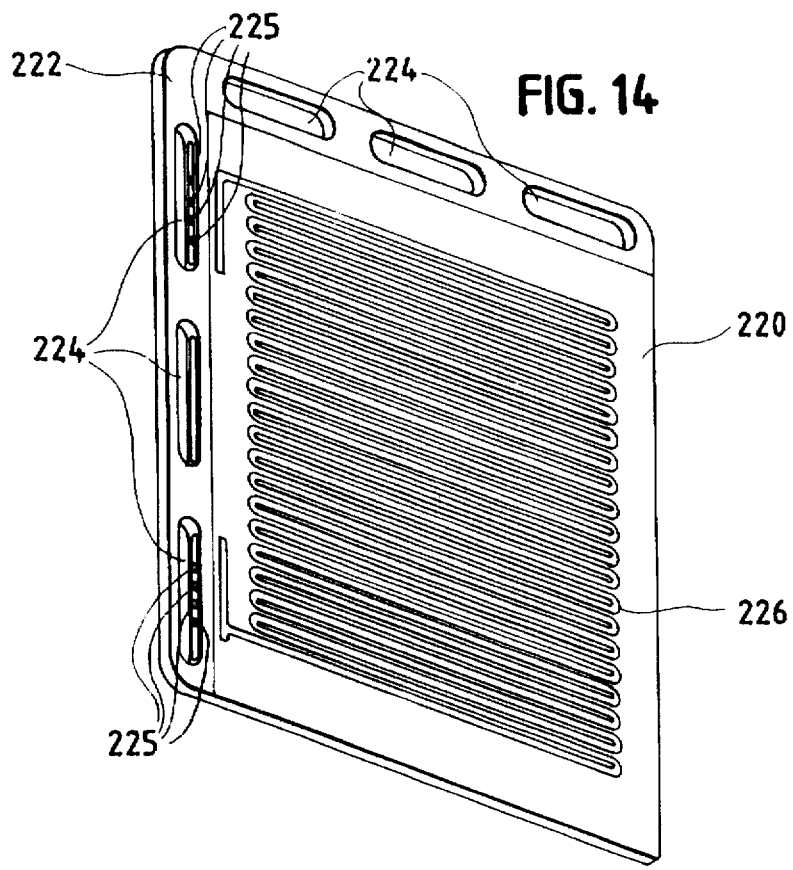
FIG. 14 is a perspective view of a fluid flow field plate with a single edge manifold plate attached thereto along two sides.

FIG. 14 shows a fluid flow field plate 220 with a single edge manifold plate 222 attached thereto along two sides. Edge manifold plate 220 has interior manifold openings 224 formed therein for conducting the reactant and coolant streams introduced to and exhausted from the adjacent fuel cell stack. Edge manifold plate 222 has channels 225 formed therein for effecting fluid communication between the manifold openings 224 and flow channels in flow field plate 220, such as flow channel 226 shown in FIG. 14.

Figure 15:
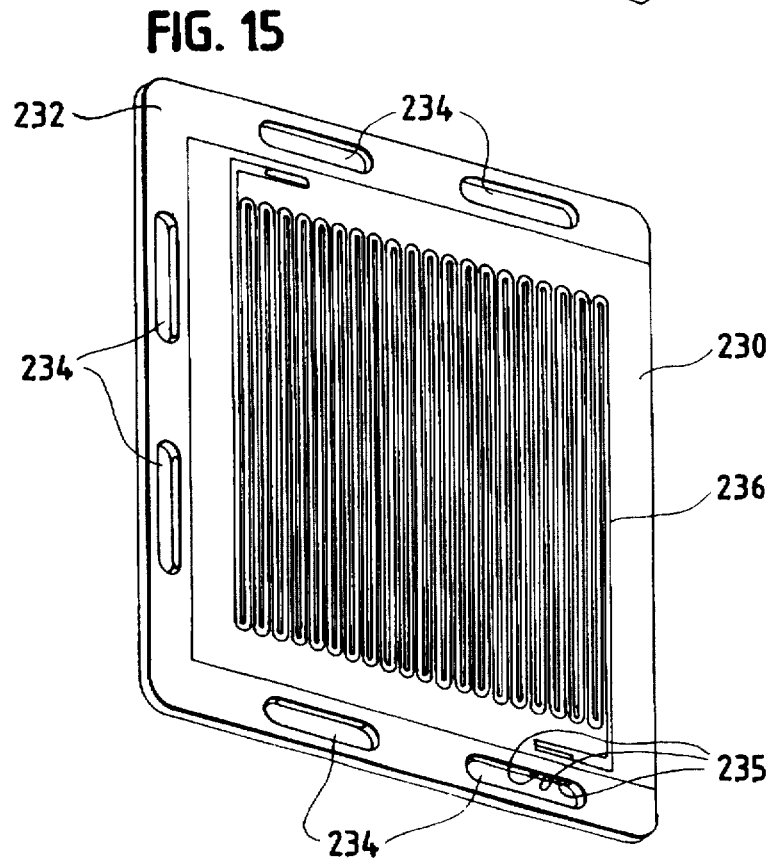
FIG. 15 is a perspective view of a fluid flow field plate with a single edge manifold plate attached thereto along three sides.

FIG. 15 shows a fluid flow field plate 230 with a single edge manifold plate 232 attached thereto along three sides. Edge manifold plate 232 has interior manifold openings 234 formed therein for conducting the reactant and coolant streams introduced to and exhausted from the adjacent fuel cell stack. Edge manifold plate 232 has channels 235 formed therein for effecting fluid communication between the manifold openings 234 and flow channels in flow field plate 230, such as flow channel 236 shown in FIG. 15.

FIGS. 16 and 17 show a fluid flow field plate 240 with a pair of edge manifold plates 242a, 242b attached thereto. Each edge manifold plate 242a, 242b has a single interior manifold opening 244a, 244b, respectively, formed therein for conducting a reactant or coolant stream. Edge manifold plates 242a, 242b have channels 245a, 245b formed therein for effecting fluid communication between the manifold openings 242a, 242b and flow channels in flow field plate 240, such as flow channel 246 shown in FIGS. 16 and 17.

Figure 18:
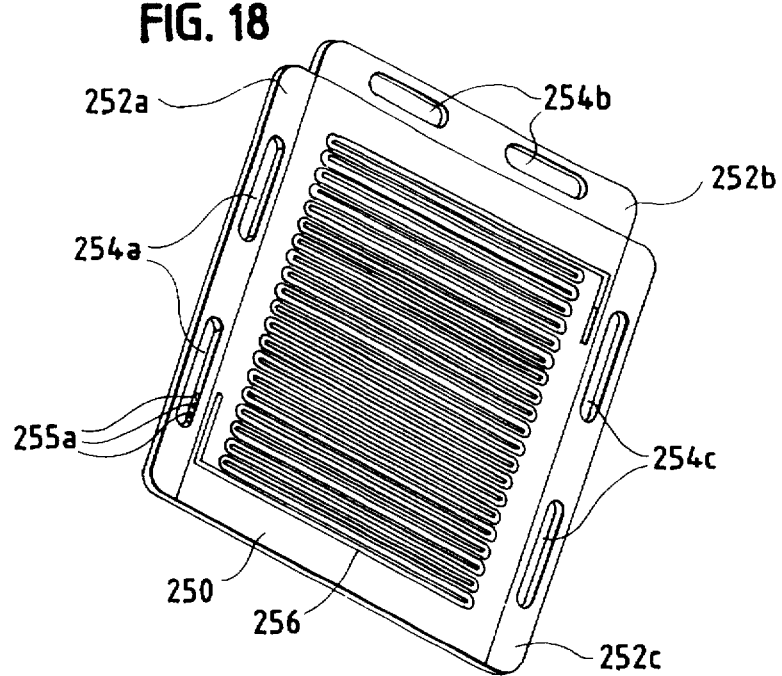
FIG. 18 is a perspective view of a fluid flow field plate with three noncontiguous edge manifold plates attached thereto along three sides.
Figure 19:
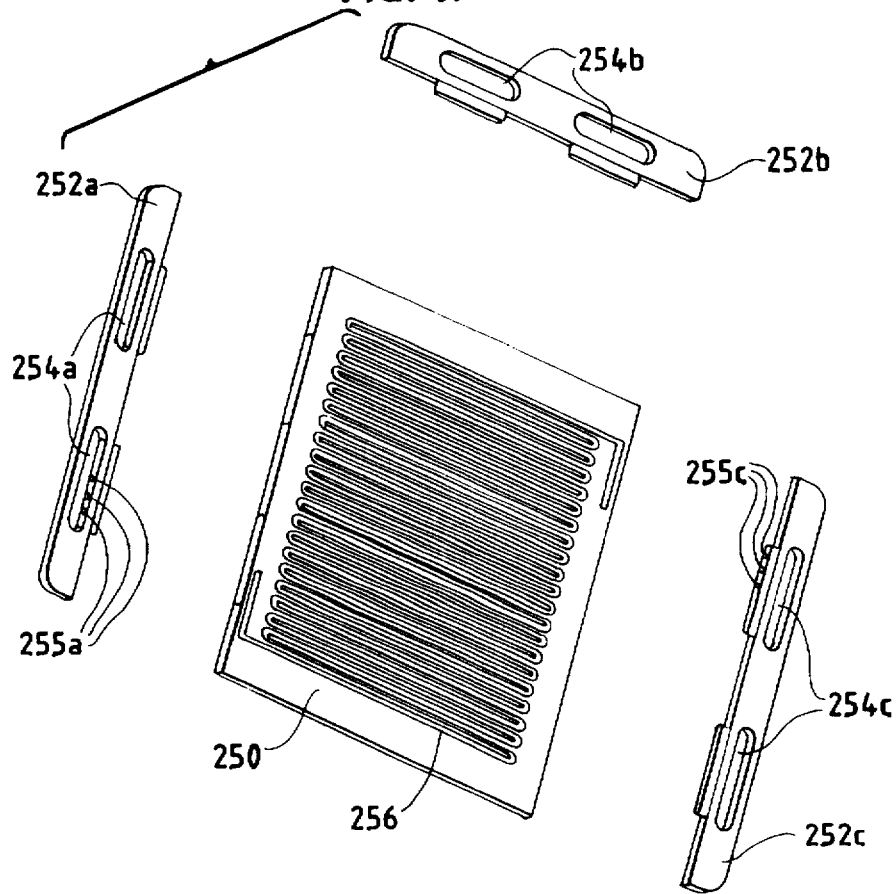
FIG. 19 is an exploded perspective view of the fluid flow field plate with three noncontiguous edge manifold plates attached thereto, illustrated in assembled form in FIG. 18.

FIGS. 18 and 19 show a fluid flow field plate 250 with three noncontiguous edge manifold plates 252a, 252b, 252c attached thereto along three sides. Each edge manifold plate 252a, 252b, 252c has a pair of interior manifold openings 254a, 254b, 254c formed therein for conducting the reactant and coolant streams introduced to and exhausted from the adjacent fuel cell stack. Each edge manifold plate 252 has channels 255a, 255b, 255c formed therein for effecting fluid communication between the manifold openings 254a, 254b, 254c and flow channels 256 in flow field plate 250, such as flow channel 256 shown in FIGS. 18 and 19.

FIGS. 20 and 21 show a fluid flow field plate 260 with four noncontiguous edge manifold plates 262a, 262b, 262c, 262d attached thereto along four sides. Each edge manifold plate 262a, 262b, 262c, 262d has a pair of interior manifold openings 264a, 264b, 264c, 264d formed therein for conducting the reactant and coolant streams introduced to and exhausted from the adjacent fuel cell stack. Each edge manifold plate 262 has channels 265a, 265b, 265c, 265d formed therein for effecting fluid communication between the manifold openings 264a, 264b, 264c, 264d and flow channels in flow field plate 260, such as flow channel 266 shown in FIGS. 20 and 21.

In this application, the term "cross section" means in a direction parallel to one of the major surfaces of the fuel cell fluid flow field plates.

In edge manifold assemblies in which each fuel cell is polygonal in cross section and each fuel cell has at least three edge manifold plates attached thereto, one or more sides of the fuel cell could each have multiple edge manifold plates attached thereto. Each edge manifold plate could also extend less than the entire length of a side.

The advantages of the present edge manifold assembly are as follows:

(1) the present edge manifold assembly, when attached on less than all sides of the fuel cell stack, occupies less volume than conventional frame manifolds, while avoiding the curtailment of area on the anode plate, cathode plate and MEA from interior manifold openings or perforations;

(2) the present edge manifold plates are simple and inexpensive to manufacture using conventional molding techniques;

(3) the present edge manifold assemblies employ an effective compressive sealing technique, namely, the controlled compression, using a notched portion and a hard-stop ridge, of a sealing gasket disposed within the recessed portion of the adjacent edge manifold plate, to isolate the reactant and coolant streams from each other, from the electrochemically active region of the fuel cell, and from the external environment; and (4) the present edge manifold assembly, attached on less than all sides of the fuel cell stack, provides access to the interior stack components, such as the fuel cells themselves and associated structures such as bus plates.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An edge manifold assembly for an electrochemical fuel cell stack comprising a plurality of fuel cells, said assembly comprising a plurality of manifold plates, each of said fuel cells having at least three manifold plates attached thereto, each of said manifold plates having at least one manifold opening formed therein for containing a fluid and having at least one channel formed therein for effecting fluid communication between said manifold opening and the fuel cell to which each of said manifold plates is attached.

2. The edge manifold assembly of claim 1 wherein each of said fuel cells is substantially rectangular in cross section and said at least three manifold plates is three manifold plates each disposed on a different side of each of said fuel cells.

3. The edge manifold assembly of claim 2 wherein each of said fuel cells is substantially square in cross section.

4. The edge manifold assembly of claim 1 wherein each of said fuel cells is substantially rectangular in cross section and said at least three manifold plates is four manifold plates each disposed on a different side of each of said fuel cells.

5. The edge manifold assembly of claim 4 wherein each of said fuel cells is substantially square in cross section.

6. The edge manifold assembly of claim 1 wherein each of said manifold plates has a tube mounted within each of said at least one channel, said tube extending from said manifold plate into the fuel cell to which said manifold plate is attached.

7. The edge manifold assembly of claim 6 wherein said tube is metallic.

8. The edge manifold assembly of claim 1 wherein said at least one channel comprises a plurality of spaced channels for effecting fluid communication between said manifold opening and the fuel cell to which said manifold plates are attached.

9. The edge manifold assembly of claim 8 wherein said channels extend through each of said manifold plates substantially in parallel.

10. The edge manifold assembly of claim 9 wherein said at least one manifold opening is formed such that said channels extend through each of said manifold plates substantially the same distance.

11. The edge manifold assembly of claim 1 wherein each of said manifold plates has a recessed portion formed in one surface thereof, said recessed portion substantially circumscribing said at least one manifold opening, and a notched portion extending from the oppositely facing surface thereof, whereby said notched portion extends into the recessed portion of the adjacent manifold plate.

12. The edge manifold assembly of claim 11 further comprising a sealing gasket disposed within said recessed portion such that the notched portion of the adjacent manifold plate compresses said sealing gasket.

13. The edge manifold assembly of claim 1 wherein said manifold plates are formed from an electrically insulating material.

14. An edge manifold assembly for an electrochemical fuel cell stack comprising a plurality of fuel cells, said assembly comprising a plurality of manifold plates, each of said fuel cells having a single manifold plate attached thereto, said manifold plate having at least one manifold opening formed therein for containing a fluid and having at least one channel formed therein for effecting fluid communication between said manifold opening and the fuel cell to which said manifold plate is attached, said manifold plate not completely circumscribing the fuel cell to which said manifold plate is attached.

15. The edge manifold assembly of claim 14 wherein each of said fuel cells is polygonal in cross section.

16. The edge manifold assembly of claim 14 wherein said manifold plate has a tube mounted within each of said at least one channel, said tube extending from said manifold plate into the fuel cell to which said manifold plate is attached.

17. The edge manifold assembly of claim 16 wherein said tube is metallic.

18. The edge manifold assembly of claim 14 wherein said at least one channel comprises a plurality of spaced channels for effecting fluid communication between said manifold opening and the fuel cell to which said manifold plate is attached.

19. The edge manifold assembly of claim 18 wherein said channels extend through said manifold plate substantially in parallel.

20. The edge manifold assembly of claim 19 wherein said at least one manifold opening is formed such that said channels extend through said manifold plate substantially the same distance.

21. The edge manifold assembly of claim 14 wherein said manifold plate has a recessed portion formed in one surface thereof, said recessed portion substantially circumscribing said at least one manifold opening, and a notched portion extending from the oppositely facing surface thereof, whereby said notched portion extends into the recessed portion of the adjacent manifold plate.

22. The edge manifold assembly of claim 21 further comprising a sealing gasket disposed within said recessed portion such that the notched portion of the adjacent manifold plate compresses said sealing gasket.

23. The edge manifold assembly of claim 14 wherein said manifold plate is formed from an electrically insulating material.

24. An electrochemical fuel cell stack comprising a plurality of fuel cells, each of said fuel cells having at least three manifold plates attached thereto, each of said manifold plates having at least one manifold opening formed therein for containing a fluid and having at least one channel formed therein for effecting fluid communication between said manifold opening and the fuel cell to which each of said manifold plates is attached.

25. The fuel cell stack of claim 24 wherein each of said fuel cells is substantially rectangular in cross section and said at least three manifold plates is three manifold plates each disposed on a different side of each of said fuel cells.

26. The fuel cell stack of claim 25 wherein each of said fuel cells is substantially square in cross section.

27. The fuel cell stack of claim 24 wherein each of said fuel cells is substantially rectangular in cross section and said at least three manifold plates is four manifold plates each disposed on a different side of each of said fuel cells.

28. The fuel cell stack of claim 27 wherein each of said fuel cells is substantially square in cross section.

29. The fuel cell stack of claim 24 wherein each of said manifold plates has a tube mounted within each of said at least one channel, said tube extending from said manifold plate into the fuel cell to which said manifold plate is attached.

30. The fuel cell stack of claim 29 wherein said tube is metallic.

31. The fuel cell stack of claim 24 wherein said at least one channel comprises a plurality of spaced channels for effecting fluid communication between said manifold opening and the fuel cell to which said manifold plate is attached.

32. The fuel cell stack of claim 31 wherein said channels extend through said each of said manifold plates substantially in parallel.

33. The fuel cell stack of claim 32 wherein said at least one manifold opening is formed such that said channels extend through said each of said manifold plates substantially the same distance.

34. The fuel cell stack of claim 24 wherein each of said manifold plates has a recessed portion formed in one surface thereof, said recessed portion substantially circumscribing said at least one manifold opening, and a notched portion extending from the oppositely facing surface thereof, whereby said notched portion extends into the recessed portion of the adjacent manifold plate.

35. The fuel cell stack of claim 34 further comprising a sealing gasket disposed within said recessed portion such that the notched portion of the adjacent manifold plate compresses said sealing gasket.

36. The fuel cell stack of claim 24 wherein said manifold plates are formed from an electrically insulating material.

37. An electrochemical fuel cell stack comprising a plurality of fuel cells, each of said fuel cells having a single manifold plate attached thereto, said manifold plate having at least one manifold opening formed therein for containing a fluid and having at least one channel formed therein for effecting fluid communication between said manifold opening and the fuel cell to which said manifold plate is attached, said manifold plate not completely circumscribing the fuel cell to which said manifold plate is attached.

38. The fuel cell stack of claim 37 wherein each of said fuel cells is polygonal in cross section.

39. The fuel cell stack of claim 37 wherein said manifold plate has a tube mounted within each of said at least one channel, said tube extending from said manifold plate into the fuel cell to which said manifold plate is attached.

40. The fuel cell stack of claim 39 wherein said tube is metallic.

41. The fuel cell stack of claim 37 wherein said at least one channel comprises a plurality of spaced channels for effecting fluid communication between said manifold opening and the fuel cell to which said manifold plate is attached.

42. The fuel cell stack of claim 41 wherein said channels extend through said manifold plate substantially in parallel.

43. The fuel cell stack of claim 42 wherein said manifold opening is formed such that said channels extend through said manifold plate substantially the same distance.

44. The fuel cell stack of claim 37 wherein said manifold plate has a recessed portion formed in one surface thereof, said recessed portion substantially circumscribing said at least one manifold opening, and a notched portion extending from the oppositely facing surface thereof, whereby said notched portion extends into the recessed portion of the adjacent manifold plate.

45. The fuel cell stack of claim 44 further comprising a sealing gasket disposed within said recessed portion such that the notched portion of the adjacent manifold plate compresses said sealing gasket.

46. The fuel cell stack of claim 37 wherein said manifold plate is formed from an electrically insulating material.

* * * * *

UNITED STATES PATENT AND TRADEMARK OFFICE
CERTIFICATE OF CORRECTION

PATENT NO.  : 5,750,281
DATED       : May 12, 1998
INVENTOR(S) : Kirk B. Washington, John T. Kenna, Greg A. James, and Shiraz N. Ramji It is certified that error appears in the above-identified patent and that said Letters Patent is hereby corrected as shown below:

At Col. 8, line 24, delete "1321" and substitute therefor --132'--

At Col. 8, line 35, delete "1441" and substitute therefor --144'-

At Col. 9, line 8, delete "120bhard-stop" and substitute therefor --120b, hard-stop--

At Col. 9, line 22, delete "120bhard-stop" and substitute therefor --120b, hard-stop--

At Col. 10, line 10, delete "256"

Signed and Sealed this

Twelfth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,750,281
DATED : May 12, 1998
INVENTOR(S) : Kirk B. Washington, John T. Kenna, Gregory A. James and Shiraz N. Ramji It is certified that error appears in the above-identified patent and that said Letters Patent is hereby corrected as shown below:

Title page,
Inventors, replace the name "Greg" and insert -- Gregory --.

Signed and Sealed this

Sixteenth Day of April, 2002

Attest:

JAMES E. ROGAN
*Attesting Officer*   *Director of the United States Patent and Trademark Office*